(12) United States Patent
Orus Lacort et al.

(10) Patent No.: US 11,934,464 B2
(45) Date of Patent: Mar. 19, 2024

(54) UNSUPERVISED CLUSTERING

(71) Applicant: MULTIVERSE COMPUTING SL, Donostia (ES)

(72) Inventors: Roman Oscar Orus Lacort, Donostia (ES); Pablo Bermejo Navas, Donostia (ES)

(73) Assignee: MULTIVERSE COMPUTING S.L., Donostia (ES)

( * ) Notice: Subject to any disclaimer, the term of this patent is extended or adjusted under 35 U.S.C. 154(b) by 64 days.

(21) Appl. No.: 17/829,890

(22) Filed: Jun. 1, 2022

(65) Prior Publication Data
US 2023/0367822 A1 Nov. 16, 2023

(30) Foreign Application Priority Data

May 12, 2022 (EP) .................................... 22382461

(51) Int. Cl.
*G06F 16/906* (2019.01)
*G06N 10/60* (2022.01)
(52) U.S. Cl.
CPC ........... *G06F 16/906* (2019.01); *G06N 10/60* (2022.01)
(58) Field of Classification Search
None
See application file for complete search history.

(56) References Cited

U.S. PATENT DOCUMENTS

2021/0192381 A1* 6/2021 Ijaz .......................... G06N 3/08

FOREIGN PATENT DOCUMENTS

EP   4276702 A1   5/2023

OTHER PUBLICATIONS

European Search Report, Application No. 23382454.9, dated Sep. 29, 2023, 10 pages.
Perez-Salinas, et al., "Data-re-uploading for a universal quantum classifier", Jan. 30, 2020, 19 pages https://quantum-journal.org/papers/q-202-02-06-226.
Landman, "Quantum Algorithms for Unsupervised Machine Learning and Neural Networks", Cornell University, Nov. 5, 2021, 191 pages.

\* cited by examiner

*Primary Examiner* — Kannan Shanmugasundaram
(74) *Attorney, Agent, or Firm* — Edell, Shapiro & Finnan, LLC

(57) ABSTRACT

Method for performing unsupervised clustering of a data set including a plurality of data points by means of minimization of a cost function by a classical digital computer. The classical digital computer locates each data point on a Bloch sphere and sends the position of the data point to a quantum computer. The quantum computer translates each position to a quantum state of a plurality of qubits and implements a quantum circuit on them. The quantum circuit modifies the quantum state of the qubits to a final quantum state based on a plurality of optimized variational parameters provided by an optimizer of the cost function performed in the classical digital computer, the final quantum state corresponding to the label in which each data point is clustered.

21 Claims, 4 Drawing Sheets

UNSUPERVISED CLUSTERING

CROSS-REFERENCE TO RELATED APPLICATIONS

This application related to and claims the benefit and priority to European Application No. EP22382461.6, filed May 12, 2022, which is incorporated herein by reference in its entirety.

FIELD

The present invention relates to unsupervised clustering of a data set comprising a plurality of data points.

BACKGROUND

Methods for performing unsupervised clustering of a data set comprising a plurality of data points are known. These methods are also known to be performed in a hybrid computing system comprising a classical digital computer performing part of the method, and a quantum computer performing the other part of the method, wherein a qubit in the quantum computer is used to represent each of the data points in the data set. However, current technology imposes a limitation on the number of qubits that a quantum computer can have, which in turn limits the number of data points that can be clustered in such a hybrid computing system.

SUMMARY

Nowadays, one of the main interests within the machine learning community relies on improving machine learning algorithms based on a training procedure, for which it is necessary to own correct classified data, which serves as a basis to recognize and classify new inflows of data. In a society built upon information, one can easily understand the benefits of predicting trends or characterizing data based on known results and stored information. However, there are times in which one has no clue of what pattern is behind the data to be studied and has no manner either to relate that particular data set to any other previously acknowledged. This is the context in which unsupervised clustering techniques show up, these techniques being configured to gather data within families based on the distribution existing in a given data set, with no previous information about it.

The object of the invention is to provide a first and a second method for performing unsupervised clustering of a data set comprising a plurality of data points, and a first and a second computer-readable medium comprising computer-executable instructions for a method for performing unsupervised clustering of a data set comprising a plurality of data points.

The first method for performing unsupervised clustering of a data set comprising a plurality of data points of the invention comprises the following steps:
- a data set importing step wherein a classical digital computer imports the plurality of data points of the data set,
- a data point locating step wherein the classical digital computer locates the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit,
- a cost function definition step wherein a cost function is defined, the cost function having its minimum cost when the data points are clustered optimally, the cost function comprising a plurality of sets of variational parameters, each set of variational parameters comprising at least one group of three variational parameters, and the plurality of sets of variational parameters being common to all the data points, and
- an initial cost function calculation step wherein the classical digital computer calculates the cost of the cost function based on the initial position vector of each data point of the data set.

Next, the first method for performing unsupervised clustering comprises a cost function minimization step comprising the following steps which are repeated until the cost function reaches its minimum cost:
- a classical optimizer execution step wherein the classical digital computer executes a classical optimizer for the cost function, obtaining a plurality of sets of optimized variational parameters,
- an optimized variational parameter sending step wherein the classical digital computer sends the plurality of sets of optimized variational parameters to a quantum computer, the quantum computer comprising as many qubits as the number of sets of variational parameters in the cost function and a quantum circuit configured for performing a plurality of operations on said qubits,
- a data point processing step comprising the following steps which are repeated for each data point in the data set:
  - an initial position vector sending step wherein the classical digital computer sends the initial position vector of each data point of the data set to the quantum computer,
  - an initial position vector translation step wherein the quantum computer translates said initial position vector into a corresponding initial quantum state of a qubit, and initializes the plurality of qubits in the quantum circuit in said initial quantum state,
  - a quantum circuit execution step wherein the quantum computer implements the quantum circuit, the quantum circuit comprising as many layers on each qubit as the number of groups of three variational parameters in the corresponding set of variational parameters, each layer modifying the quantum state of the corresponding qubit based on the values of the three optimized variational parameters in each group, and the last layer on each qubit modifying the quantum state of said qubit to a final quantum state, the plurality of qubits in the quantum circuit being entangled, and
  - a quantum state sending step wherein the quantum computer measures and sends the final quantum state of the qubits in the quantum circuit and the probability of said qubits being in said final quantum state to the classical digital computer, the final quantum state of the qubits in the quantum circuit corresponding to a label in which the corresponding data point is located, and
- a cost function calculation step wherein the classical digital computer calculates the cost of the cost function based on the final quantum state of the qubits in the quantum circuit of all the data points of the data set and the probability of said qubits being in said final quantum state.

The second method for performing unsupervised clustering of a data set comprising a plurality of data points comprises the following steps:
- a data set importing step wherein a classical digital computer imports the plurality of data points of the data set,
- a data point locating step wherein the classical digital computer locates the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit,
- a label selection step wherein a number of labels in which the data points will be clustered in the classical digital computer is selected,
- a label locating step wherein the classical digital computer locates uniformly the labels on the Bloch sphere, the position of each label on the Bloch sphere being identified by a corresponding initial label vector in the Bloch sphere pointing to the center of said label,
- a cost function definition step wherein a cost function is defined, the cost function having its minimum cost when the data points are clustered optimally, the cost function comprising a set of variational parameters, the set of variational parameters comprising at least one group of three variational parameters, and the set of variational parameters being common to all the data points, and
- an initial cost function calculation step wherein the classical digital computer calculates the cost of the cost function based on the initial position vector of each data point of the data set, and the initial label vector of each of the labels on the Bloch sphere.

Next, the second method for performing unsupervised clustering comprises a cost function minimization step comprising the following steps which are repeated until the cost function reaches its minimum cost:
- a classical optimizer execution step wherein the classical digital computer executes a classical optimizer for the cost function, obtaining a set of optimized variational parameters,
- an optimized variational parameter sending step wherein the classical digital computer sends the set of optimized variational parameters to a quantum computer, the quantum computer comprising a qubit and a quantum circuit configured for performing a plurality of operations on said qubit,
- a data point processing step comprising the following steps which are repeated for each data point in the data set:
  - an initial position vector sending step wherein the classical digital computer sends the initial position vector of each data point of the data set to the quantum computer,
  - an initial position vector translation step wherein the quantum computer translates said initial position vector into a corresponding initial quantum state of a qubit, and initializes the qubit in the quantum circuit in said quantum state,
  - a quantum circuit execution step wherein the quantum computer implements the quantum circuit, the quantum circuit comprising as many layers on the qubit as the number of groups of three variational parameters in the set of variational parameters, each layer modifying the quantum state of the qubit based on the values of the three optimized variational parameters in each group, and the last layer modifying the quantum state of the qubit to a final quantum state,
  - a quantum circuit sending step wherein the quantum computer measures and sends the final quantum state of the qubit in the quantum circuit to the classical digital computer, and
  - a quantum state translation step wherein the classical digital computer translates the final quantum state of the qubit to a corresponding final position vector of the corresponding data point of the data set, and
- a cost function calculation step wherein the classical digital computer calculates the cost of the cost function based on the final position vector of each data point of the data set, and the initial label vector of each of the labels.

It is also provided a first and a second computer-readable medium comprising computer-executable instructions for the first or the second method for performing unsupervised clustering of the invention respectively, the computer-readable medium being configured to be used in a classical digital computer.

Unsupervised clustering methods known in the state of the art, when performed in a hybrid computing system comprising a classical digital computer and a quantum computer, use a qubit to represent each of the data points in the data set. As current technology imposes a limitation on the number of qubits a quantum computer can have, these methods are able to perform unsupervised clustering of a data set with as many data points as qubits a quantum computer can have. The method for performing unsupervised clustering of the invention, as well as the hybrid computing system and the computer-readable medium, aim at solving this problem by using only a qubit in the quantum computer, thus avoiding the existing limitation in the number of data points a data set can have when unsupervised clustering is to be performed on the data set by using a hybrid computing system.

DETAILED DESCRIPTION

Figure 1:
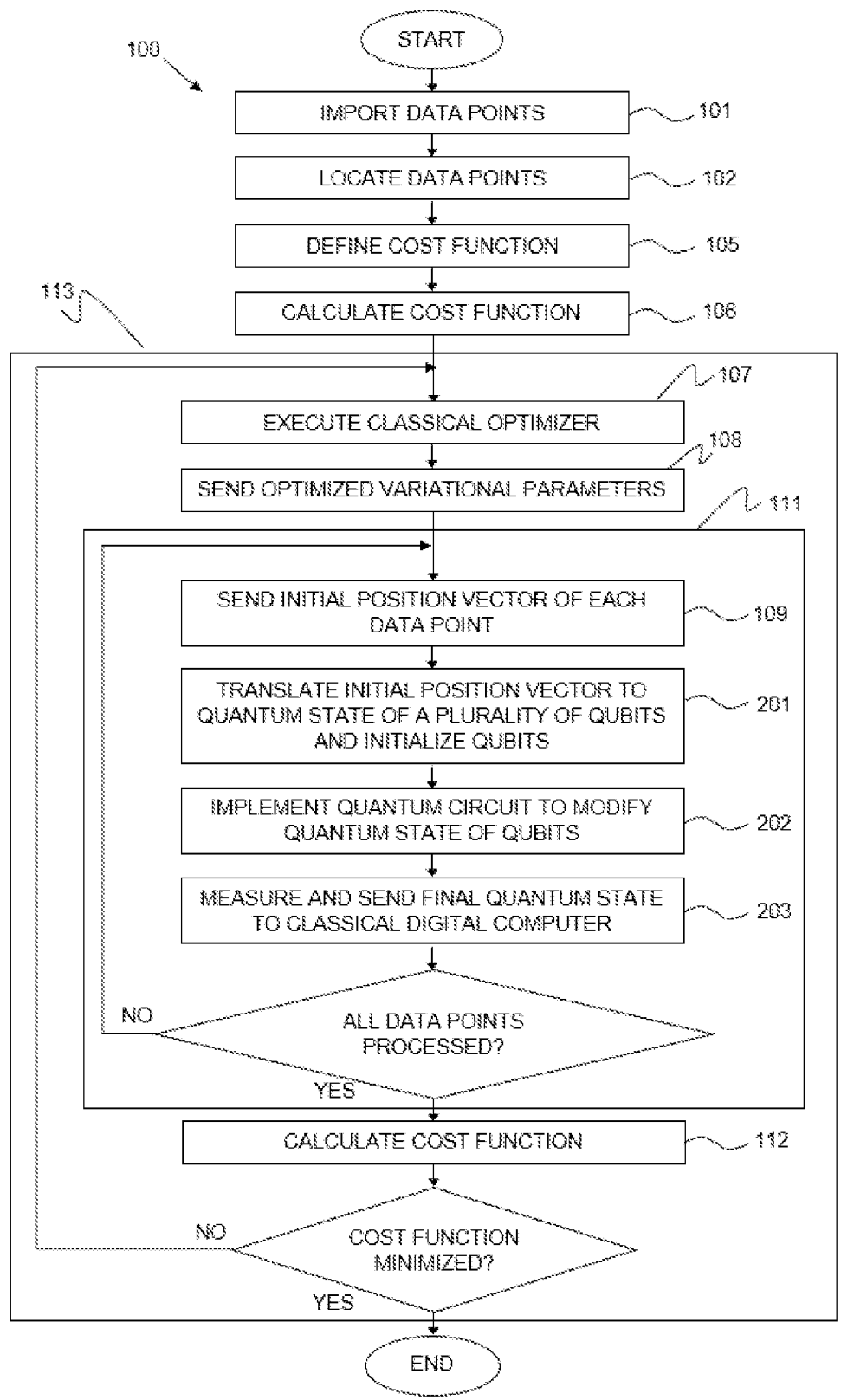
FIG. 1 is a flowchart that illustrates an embodiment of the first method for performing unsupervised clustering of a data set comprising a plurality of data points by means of a plurality of qubits according to the present invention.

FIG. 1 illustrates an embodiment of a first method for performing unsupervised clustering of a data set comprising a plurality of data points according to the present invention.

The first method 100 for performing unsupervised clustering of a data set comprising a plurality of data points comprises the following steps:
- a data set importing step 101 wherein a classical digital computer 500 imports the plurality of data points of the data set,
- a data point locating step 102 wherein the classical digital computer 500 locates the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit,
- a cost function definition step 105 wherein a cost function is defined, the cost function having its minimum cost when the data points are clustered optimally, the cost function comprising a plurality of sets of variational parameters, each set of variational parameters comprising at least one group of three variational parameters, and the plurality of sets of variational parameters being common to all the data points, and
- an initial cost function calculation step 106 wherein the classical digital computer 500 calculates the cost of the cost function based on the initial position vector of each data point of the data set.

Next, the first method 100 for performing unsupervised clustering comprises a cost function minimization step 113 comprising the following steps which are repeated until the cost function reaches its minimum cost:
- a classical optimizer execution step 107 wherein the classical digital computer 500 executes a classical optimizer for the cost function, obtaining a plurality of sets of optimized variational parameters,
- an optimized variational parameter sending step 108 wherein the classical digital computer 500 sends the plurality of sets of optimized variational parameters to a quantum computer 400, the quantum computer 400 comprising as many qubits as the number of sets of variational parameters in the cost function and a quantum circuit configured for implementing a plurality of operations on said qubits,
- a data point processing step 111 comprising the following steps which are repeated for each data point in the data set:
  - an initial position vector sending step 109 wherein the classical digital computer 500 sends the initial position vector of each data point of the data set to the quantum computer 400,
  - an initial position vector translation step 201 wherein the quantum computer 400 translates said initial position vector into a corresponding initial quantum state of a qubit, and initializes the plurality of qubits in the quantum circuit in said initial quantum state,
  - a quantum circuit execution step 202 wherein the quantum computer 400 implements the quantum circuit, the quantum circuit comprising as many layers on each qubit as the number of groups of three variational parameters in the corresponding set of variational parameters, each layer modifying the quantum state of the qubit based on the values of the three optimized variational parameters in each group, and the last layer on each qubit modifying the quantum state of said qubit to a final quantum state, the plurality of qubits in the quantum circuit being entangled, and
  - a quantum state sending step 203 wherein the quantum computer 400 measures and sends the final quantum state of the qubits in the quantum circuit and the probability of said qubits being in said final quantum state to the classical digital computer 500, the final quantum state of the qubits in the quantum circuit corresponding to a label in which the corresponding data point is located, and
- a cost function calculation step 112 wherein the classical digital computer 500 calculates the cost of the cost function based on the final quantum state of the qubits in the quantum circuit of all the data points of the data set and the probability of said qubits being in said final quantum state.

The goal of the method 100 for performing unsupervised clustering of the invention is partitioning the plurality of data points in the data set into subsets of data points called labels, such that the data points which are similar are grouped within the same label, whereas dissimilar data points are placed in different labels. Each of the data points in the data set comprises a plurality of attributes, such that, depending on the value of those attributes, the data points will be grouped in the same or in different labels, in such a way that each data point within the data set is assigned to one and only one label.

The classical digital computer 500 comprises a memory element 504 comprising a computing program, the computing program defining a plurality of computer-executable instructions in a source language, and a processor 502 communicatively coupled to the memory element 504, the memory element 504 comprising the computer-executable instructions that, when executed by the processor 502 cause the processor 502 to perform the steps 101 to 113 of the method 100. In at least one embodiment, the classical digital computer 500 may include one or more I/O interface(s). I/O interface(s) allow for input and output of data and/or information with other entities that may be connected to the classical digital computer 500. For example, I/O interface(s) may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In the data set importing step 101 of the first method 100, the classical digital computer 500 imports the plurality of data points of the data set, each data point comprising a plurality of attributes. According to an embodiment, I/O interface(s) of the classical digital computer 500 are used to import the plurality of data points.

In the data point locating step 102, the classical digital computer 500 locates the plurality of data points on the surface of a unique Bloch sphere. Depending on the number of attributes and their values for each data point, the data points can be represented on a 2-dimensional plane for example in case each data point has two attributes, on a 3-dimensional space in case each data point has three attributes, etc. In an embodiment where each data point has two attributes, the classical digital computer 500 locates each data point on the Bloch sphere by, starting from a position of the Bloch sphere common to all the data points, first rotating it a first angle in a Y direction, the first angle being proportional to the value of a first attribute, and then a second angle in a Z direction, the second angle being proportional to the value of a second attribute. In an embodiment where each data point has three attributes, the classical digital computer 500 locates each data point on the Bloch sphere by means of three rotations along axis Z-Y-Z (set of Euler rotations) from a position of the Bloch sphere common to all the data points, such that the angle rotated along each of the axes is proportional to the value of the corresponding attribute. In other embodiments, the classical digital computer 500 is configured to locate the plurality of data points on the surface of the unique Bloch sphere by means of other methods known in the state of the art.

Once all the data points are located on the Bloch sphere, the position of each data point on the Bloch sphere is identified by a corresponding initial position vector in the Bloch sphere, the Bloch sphere representing a qubit, and the initial position vector of each data point on the Bloch sphere representing a quantum state of the qubit. A qubit is the quantum analogue of the classical bit. In contrast with its classical counterpart, a qubit can exist in a superposition of states. Formally, a quantum state vis represented by a unit two-dimensional complex vector. The method 100 of the invention stablishes a correspondence between the initial position vector of each of the data points on the Bloch sphere in the classical part of the algorithm with a corresponding quantum state of a qubit in the quantum part.

As in all methods aiming at finding the optimum configuration of a given system, a cost function has to be construed such that the cost function has a minimum at the point in which the configuration of the system is optimum. In the method 100 of the invention, the minimum cost of the cost function will be reached when data points are assigned to the corresponding labels optimally. Once all data points are located on the Bloch sphere, the cost function, by minimization of its cost, will provide groups of three optimized variational parameters or groups of three optimized angles to be used in the quantum circuit of the quantum computer.

In the initial cost calculation step 106 of the first method 100, the classical digital computer 500 calculates the cost of the cost function based on the initial position vector of each data point of the data set. In an embodiment, the cost function takes into account not only the distance between data points, but also the distance between each data point and the centroid position of the label in which the data point is, the centroid position being the average position of all the data points pertaining to said label.

In the classical optimizer execution step 107 of the first method 100, the classical digital computer 500 executes the classical optimizer for the cost function, obtaining a plurality of sets of optimized variational parameters, and next, in the optimized variational parameter sending step 108, the classical digital computer 500 sends the plurality of sets of optimized variational parameters to the quantum computer 400.

Even if the optimization of the cost function and the cost function calculation are implemented in the classical digital computer 500, it is the quantum computer 400 which in the first method 100 calculates the label in which each of the data points is in each cost function optimization, and the probability of said data point being in that label. This way, the method 100 of the invention benefits from the computing power of quantum computing, thus providing a hybrid solution to the clustering problem. For this purpose, the position vector of each data point on the Bloch sphere, when translated to a qubit, is considered analogous to a quantum state of the qubit. The quantum computer 400 comprises a plurality of qubits, and a quantum circuit. The quantum circuit is configured for entangling the plurality of qubits. When entanglement is introduced within qubits, the mathematical space generated by said qubits increases exponentially with the number of qubits. When using a qubit, the available states of said qubit are |0> and |1>, which are completely orthogonal. In case two qubits are used, the available states of said two qubits are |00>, |01>, |10> and |11>, and in case three qubits are used, the available states of said three qubits are |000>, |001>, |010>|011>, |100>, |101>, |110> and |111>. These states, in the corresponding Hilbert spaces (of dimension 2 for 2 qubits, dimension 3 for 3 qubits, etc.), are completely orthogonal. This is to say, when entangling more than 1 qubit, a space with $2^n$ orthogonal states is automatically generated, n being the number of qubits. In the method of this embodiment, the state of the qubits in the quantum circuit represents the labels in which the data points will be clustered.

The quantum computer comprises as many qubits as the number of sets of variational parameters in the cost function, and the quantum circuit comprises as many layers on each qubit as the number of groups of three variational parameters in the corresponding set of variational parameters in the cost function. Each layer of the quantum circuit is configured to modify the quantum state of the corresponding qubit based on the values of the three optimized parameters in each group provided by the classical optimizer.

Figure 2:
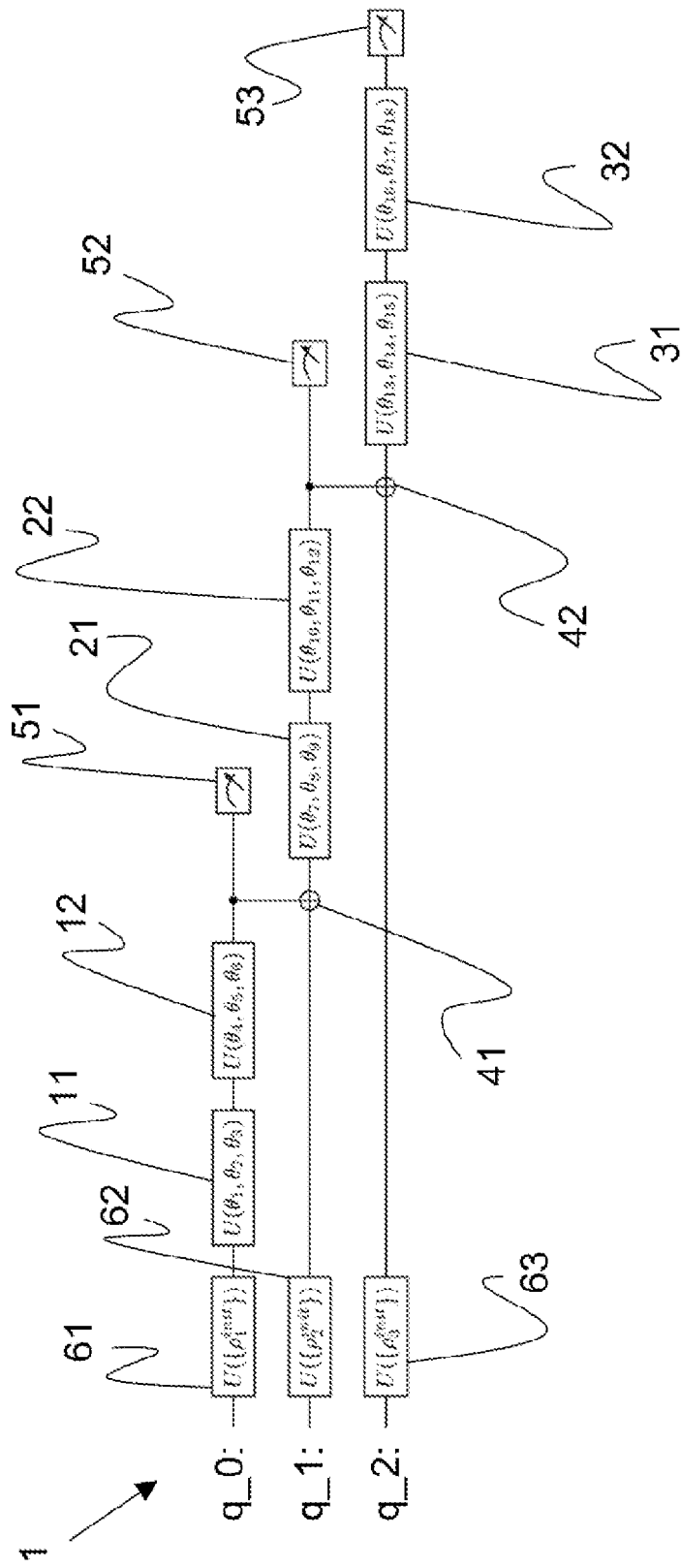
FIG. 2 is a schematic illustration of an embodiment of a quantum circuit of a quantum computer configured for performing the first method for performing unsupervised clustering of FIG. 1.

FIG. 2 is a schematic illustration of an embodiment of a quantum circuit 1 for a plurality of qubits in a quantum computer 400 configured for performing the first method 100. The quantum circuit 1 shown in FIG. 2 is configured for performing a plurality of operations on 3 qubits, namely q_0, q_1 and q_2. The quantum circuit 1 comprises an initialization quantum gate 61, 62, 63 on each qubit configured for initializing the qubit in the initial quantum state. The quantum circuit 1 additionally comprises two layers on each qubit, each layer being implemented by means of a quantum gate. So, quantum circuit 1 comprises two quantum gates on each qubit. Quantum gates 11, 12 are configured for performing unitary rotations on qubit q_0, quantum gates 21, 22 are configured for performing unitary rotations on qubit q_1, and quantum gates 31, 32 are configured for performing unitary rotations on qubit q_2. Quantum circuit 1 additionally comprises quantum gates 41, 42. Quantum gate 41 is configured for entangling qubits q_0 and q_1, and quantum gate 42 is configured for entangling qubits q_1 and q_2. In the embodiment of FIG. 2, quantum gates 41, 42 are CNOT gates. Quantum circuit 1 also comprises measurement gates 51, 52, 53 configured for measuring the quantum states of the corresponding qubits q_0, q_1 and q_2. Measurement gates 51, 52, 53 are also configured for providing the probability of qubits q_0, q_1 and q_2 of being in the states measured. As already described the cost function comprises a plurality of sets of variational parameters, each set of variational parameters comprising at least one group of three variational parameters, and the plurality of sets of variational parameters being common to all the data points.

In an embodiment of the method 100 wherein quantum computer 400 comprises the embodiment of the quantum circuit 1 shown in FIG. 2, the cost function comprises three sets of variational parameters, this is, one set per qubit in the quantum circuit, and each set of variational parameters comprises two groups of variational parameters, this is, one group per layer or quantum gate, each group comprising three variational parameters or three angles. Once the classical digital computer 500 executes the classical optimizer for the cost function, it obtains three sets of optimized variational parameters, each set comprising two groups of optimized variational parameters and sends the plurality of sets of optimized variational parameters to the quantum computer 400. The quantum circuit 1 is implemented as follows: gates 11, 12 change the quantum state of qubit q_0 by performing three unitary rotations each gate on the qubit q_0, such that the unitary rotations each gate performs is based on the values of the three optimized variational parameters in the corresponding group of optimized variational parameters of the first set of optimized variational parameters, which, as shown in FIG. 2 are $\theta_1$, $\theta_3$, $\theta_3$ in quantum gate 11 and $\theta_4$, $\theta_5$, $\theta_6$ in quantum gate 12. This is, gate 11 performs the unitary rotations on qubit q_0 based on the values of the three optimized variational parameters of the first group of the first set of optimized variational parameters, this is, $\theta_1$, $\theta_2$, $\theta_3$, and gate 12 performs the unitary rotations on qubit q_0 based on the values of the three optimized variational parameters of the second group of the first set of optimized variational parameters, this is, $\theta_4$, $\theta_5$, $\theta_6$. In the same way, gates 21, 22 change the quantum state of qubit q_1 by performing three unitary rotations each gate on the qubit q_1, such that the unitary rotations each gate performs is based on the values of the three optimized variational parameters or angles in the corresponding group of optimized variational parameters of the second set of optimized variational parameters ($\theta_7$, $\theta_8$, $\theta_9$ in quantum gate 21 and $\theta_{10}$, $\theta_{11}$, $\theta_{12}$ in quantum gate 22), and gates 31, 32 perform unitary rotations on qubit q_2 based on the values of the three optimized variational parameters in the corresponding group of optimized variational parameters of the third set of optimized variational parameters ($\theta_{13}$, $\theta_{14}$, $\theta_{15}$ in quantum gate 21 and $\theta_{16}$, $\theta_{17}$, $\theta_{18}$ in quantum gate 22).

In the data point processing step 111, for each data point in the data set the classical digital computer 500 sends the initial position vector of each data point of the data set to the quantum computer 400 in an initial position vector sending step 109.

In the first method 100, the quantum computer 400, for each initial position vector received form the classical digital computer 500 translates said initial position vector into a corresponding initial quantum state of a qubit and initializes the plurality of qubits of the quantum circuit in said initial quantum state in the initial position vector translation step 201. Next, in the quantum circuit execution step 202 of the method 100, the quantum computer 400 implements the quantum circuit, the quantum circuit comprising as many layers on each qubit as the number of groups of three variational parameters in the corresponding set of variational parameters, each layer modifying the quantum state of the corresponding qubit based on the values of the three optimized variational parameters in each group, and the last layer on each qubit modifying the quantum state of said qubit to a final quantum state, the plurality of qubits in the quantum circuit being entangled.

In the quantum state sending step 203 of the first method 100, the quantum computer 400 sends the final quantum state of the qubits in the quantum circuit and the probability of said qubits being in said final quantum state to the classical digital computer 500. So, for each execution of the classical optimizer, the quantum computer calculates the label in which each data point is clustered and the probability of said data point belonging to that label and sends both to the classical digital computer 500. One of the main advantages of the method 100 of the invention is that it only uses a quantum circuit, the same quantum circuit for processing all the data points in the data set, as the sets of optimized parameters obtained in each execution of the classical optimizer is common for all data points. Another advantage of the first method is that the number of qubits necessary in the quantum circuit for performing unsupervised clustering is highly reduced, as the qubits are the same for all data points, and the number of labels in which said data points can be clustered exponentially grows with the number of qubits used.

In the first method 100, once the classical digital computer 500 receives the final quantum state of the qubits and the probability of said qubits being in said final quantum state for all data points, in the cost function calculation step 112 of the first method 100, the classical digital computer 500 calculates the cost of the cost function based on the final quantum state of the qubits in the quantum circuit and the probability of said qubits being in said final quantum state for all data points. In case the minimum cost of the cost function is reached, the final quantum state of the qubits corresponds to the label in which the corresponding data point is optimally clustered.

In the first method 100, in case the cost of the cost function is not minimum, the classical digital computer 500 executes the classical optimizer for the cost function in the classical optimizer execution step 107, obtaining a new plurality of sets of optimized variational parameters, and sends the new plurality of sets of optimized variational parameters to the quantum computer 400 in the optimized variational parameter sending step 108. Then, for each data point in the data set, the classical digital computer 500 sends the initial position vector of said data point, and the quantum computer 400 translates said initial position vector into a corresponding initial quantum state of a qubit, initializes the plurality of qubits of the quantum circuit in the corresponding quantum state, implements the quantum circuit on the plurality of qubits each layer of the quantum circuit modifying the quantum state of the corresponding qubit based on the values of the three optimized parameters in the corresponding group obtained in the last execution of the classical optimizer, the last layer modifying the quantum state of the qubit to a final quantum state, and measures and sends the final quantum state of the plurality of qubits to the classical digital computer 500. Once the classical digital computer 500 has received the final quantum states and corresponding probabilities for all the data points from the quantum computer 400, the classical digital computer 500 calculates the cost of the cost function based on them. These steps of the method 100 are repeated until the cost function reaches its minimum cost.

According to an embodiment of the first method 100, the number of labels in which the data points are clustered is $2^n$ with n the number of qubits in the quantum circuit.

According to an embodiment of the first method 100, the method 100 for performing unsupervised clustering comprises a rescaling step 1021 wherein the classical digital computer 500 rescales the plurality of data points of the data set before locating the plurality of data points on the surface of the unique Bloch sphere. The values of the attributes for the data points are rescaled independently, such that the biggest value for each attribute is rescaled to $2^n$ as much. Depending on the range of the values for each attribute, rescaling can be higher or lower, such that the two furthest points are still on the same lap of the sphere but with no overlapping. According to an embodiment of the method 100, a safety factor of 5% to 10% is used at rescaling so that data points having a value of 0 and $2\pi$ for an attribute, with the same value for the rest of attributes, are not coincident when located on the Bloch sphere. Thus, attribute values are rescaled from 0 to $1.9\pi$ when a safety factor of 5% is used, and from 0 to $1.8\pi$ when a safety factor of 10% is used.

According to an embodiment of the first method 100, the method 100 for performing unsupervised clustering comprises a step 1071 wherein the classical digital computer 500 initializes the classical optimizer and initializes the variational parameters to random values before the classical digital computer 500 executes the classical optimizer for the first time. Depending on the classical optimizer used, it is necessary to initialize some parameters related to the optimizer before executing it. Thus, in this step, the parameters of the classical optimizer are selected.

According to an embodiment of the first method 100, the classical optimizer is a stochastic gradient descent optimizer.

According to an embodiment of the first method 100, the stochastic gradient descent optimizer is an Adam optimizer. In this embodiment, when initializing the classical optimizer, the learning rate, the batch size and the epochs are selected.

According to an embodiment of the first method 100, the stochastic gradient descent optimizer is a Momentum optimizer.

According to an embodiment of the first method 100, the quantum computer 400 is a classical digital computer 600 adapted to simulate a quantum computer 400. The quantum part of the method 100 for performing unsupervised clustering is not only suitable to be implemented in a quantum computer 400, but it can also be implemented in a classical digital computer 600 adapted to simulate the quantum circuit used in the quantum part of method 100.

According to an embodiment of the first method 100, the cost function is:

$$H = \frac{1}{2}\sum_{i,j=1}^{N}(\delta_{m_i m_j})(d(x_i, x_j)^\alpha + \lambda d(x_i, c_s))(1-f_i)(1-f_j)$$

with:
- $x_i$ being a data point of the data set, and $x_j$ being a different data point,
- N being the number of data points in the data set,
- $\delta_{m_i m_j}$ being equal to 1 where both data points $x_i$ and $x_j$ are located in the same label, and 0 where they are located in different labels, $m_i$ being the label in which data point $x_i$ is located, and $m_j$ being the label in which data point $x_j$ is located,
- m being the number of labels in which the data points will be clustered,
- $d(x_i, x_j)$ being the distance between data points $x_i$ and $x_j$,
- $d(x_i, c_s)$ being the distance between data point $x_i$ and $c_s$,
- $c_s$ being a centroid position of the label s in which data point $x_i$ is located, the centroid position being the average position of all the data points pertaining to the same label s,
- $f_i$ being the probability of data point $x_i$ belonging to label s,
- $\alpha$ being a data dependent hyperparameter of the cost function accounting for the relative importance of the distance between data points, and
- $\lambda$ being a data dependent hyperparameter of the cost function accounting for the relative importance of the distance between centroid position and data point.

According to the first method 100, the quantum circuit is sequentially implemented for each data point in the data set, such that, when the quantum circuit is implemented for a specific data point, namely, datapoint $x_i$, the qubits in the quantum circuit are initialized in the quantum state corresponding to the initial position vector of said data point $x_i$, and once the quantum circuit is implemented the final quantum state of the plurality of qubits in the quantum circuit corresponds or identifies the label to which data point $x_i$ pertains. The quantum circuit not only provides the final quantum state of the plurality of qubits in the quantum circuit, but also the probability of said plurality of qubits of being in said quantum state, namely $f_i$.

According to an embodiment of the first method 100, the hyperparameters of the cost function take the values $\alpha=2$, and $\lambda=\frac{1}{2}$.

Figure 3:
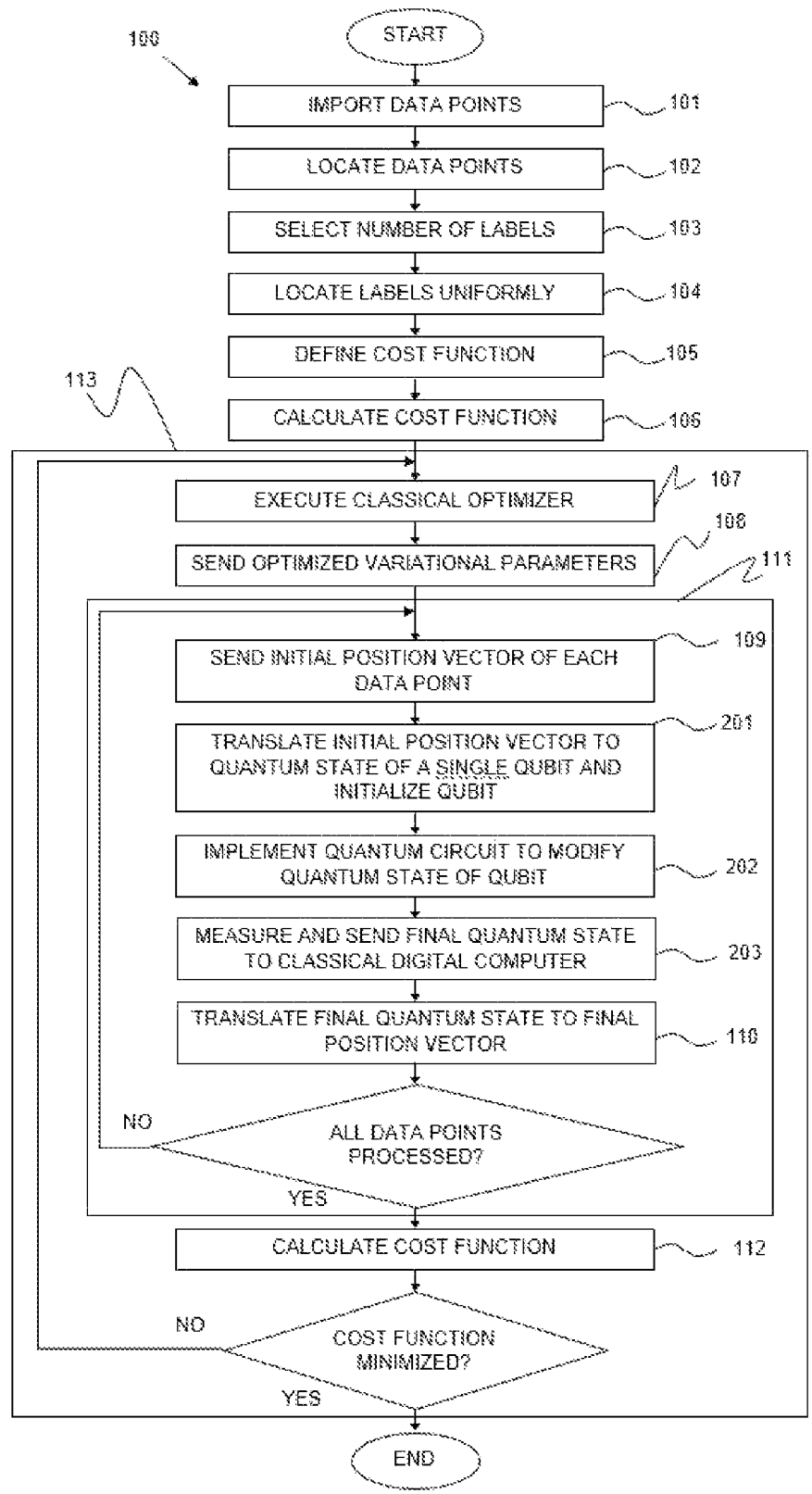
FIG. 3 is a flowchart that illustrates an embodiment of the second method for performing unsupervised clustering of a data set comprising a plurality of data points by means of a single qubit according to the present invention.

FIG. 3 illustrates an embodiment of a second method for performing unsupervised clustering of a data set comprising a plurality of data points according to the present invention.

The second method 100 for performing unsupervised clustering of a data set comprising a plurality of data points comprises the following steps:
- a data set importing step 101 wherein a classical digital computer 500 imports the plurality of data points of the data set,
- a data point locating step 102 wherein the classical digital computer 500 locates the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit,
- a label selection step 103 wherein a number of labels in which the data points will be clustered in the classical digital computer 500 is selected,
- a label locating step 104 wherein the classical digital computer 500 locates uniformly the labels on the Bloch sphere, the position of each label on the Bloch sphere being identified by a corresponding initial label vector in the Bloch sphere pointing to the center of said label,
- a cost function definition step 105 wherein a cost function is defined, the cost function having its minimum cost when the data points are clustered optimally, the cost function comprising a set of variational parameters, the set of variational parameters comprising at least one group of three variational parameters, and the set of variational parameters being common to all the data points, and
- an initial cost function calculation step 106 wherein the classical digital computer 500 calculates the cost of the cost function based on the initial position vector of each data point of the data set, and the label vector of each of the labels on the Bloch sphere.

Next, the second method 100 for performing unsupervised clustering comprises a cost function minimization step 113 comprising the following steps which are repeated until the cost function reaches its minimum cost:
- a classical optimizer execution step 107 wherein the classical digital computer 500 executes a classical optimizer for the cost function, obtaining a set of optimized variational parameters,
- an optimized variational parameter sending step 108 wherein the classical digital computer 500 sends the set of optimized variational parameters to a quantum computer 400, the quantum computer 400 comprising a qubit and a quantum circuit configured for performing a plurality of operations on said qubit,
- a data point processing step 111 comprising the following steps which are repeated for each data point in the data set:

an initial position vector sending step 109 wherein the classical digital computer 500 sends the initial position vector of each data point of the data set to the quantum computer 400, an initial position vector translation step 201 wherein the quantum computer 400 translates said initial position vector into a corresponding initial quantum state of a qubit, and initializes the qubit in the quantum circuit in said quantum state, a quantum circuit execution step 202 wherein the quantum computer 400 implements the quantum circuit, the quantum circuit comprising as many layers on the qubit as the number of groups of three variational parameters in the set of variational parameters, each layer modifying the quantum state of the qubit based on the values of the three optimized variational parameters in each group, and the last layer modifying the quantum state of the qubit to a final quantum state, a quantum circuit sending step 204 wherein the quantum computer 400 measures and sends the final quantum state of the qubit in the quantum circuit to the classical digital computer 500, and a quantum state translation step 110 wherein the classical digital computer 500 translates the final quantum state of the qubit to a corresponding final position vector of the corresponding data point of the data set, and a cost function calculation step 112 wherein the classical digital computer 500 calculates the cost of the cost function based on the final position vector of each data point of the data set, and the initial label vector of each of the labels.

The goal of the second method 100 for performing unsupervised clustering of the invention is partitioning the plurality of data points in the data set into subsets of data points called labels, such that the data points which are similar are grouped within the same label, whereas dissimilar data points are placed in different labels. Each of the data points in the data set comprises a plurality of attributes, such that, depending on the value of those attributes, the data points will be grouped in the same or in different labels, in such a way that each data point within the data set is assigned to one and only one label.

As in the first method 100, the classical digital computer 500 comprises a memory element 504 comprising a computing program, the computing program defining a plurality of computer-executable instructions in a source language, and a processor 502 communicatively coupled to the memory element 504, the memory element 504 comprising the computer-executable instructions that, when executed by the processor 502 cause the processor 502 to perform the steps 101 to 113 of the method 100. In at least one embodiment, the classical digital computer 500 may include one or more I/O interface(s). I/O interface(s) allow for input and output of data and/or information with other entities that may be connected to the classical digital computer 500. For example, I/O interface(s) may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

As in the first method 100, in the data set importing step 101 of the second method 100, the classical digital computer 500 imports the plurality of data points of the data set, each data point comprising a plurality of attributes. According to an embodiment, I/O interface(s) of the classical digital computer 500 are used to import the plurality of data points.

As in the first method 100, in the data point locating step 102 of the second method 100, the classical digital computer 500 locates the plurality of data points on the surface of a unique Bloch sphere. Depending on the number of attributes and their values for each data point, the data points can be represented on a 2-dimensional plane for example in case each data point has two attributes, on a 3-dimensional space in case each data point has three attributes, etc. In an embodiment where each data point has two attributes, the classical digital computer 500 locates each data point on the Bloch sphere by, starting from a position of the Bloch sphere common to all the data points, first rotating it a first angle in a Y direction, the first angle being proportional to the value of a first attribute, and then a second angle in a Z direction, the second angle being proportional to the value of a second attribute. In an embodiment where each data point has three attributes, the classical digital computer 500 locates each data point on the Bloch sphere by means of three rotations along axis Z-Y-Z (set of Euler rotations) from a position of the Bloch sphere common to all the data points, such that the angle rotated along each of the axes is proportional to the value of the corresponding attribute. In other embodiments, the classical digital computer 500 is configured to locate the plurality of data points on the surface of the unique Bloch sphere by means of other methods known in the state of the art.

Once all the data points are located on the Bloch sphere, the position of each data point on the Bloch sphere is identified by a corresponding initial position vector in the Bloch sphere, the Bloch sphere representing a qubit, and the initial position vector of each data point on the Bloch sphere representing a quantum state of the qubit. A qubit is the quantum analogue of the classical bit. In contrast with its classical counterpart, a qubit can exist in a superposition of states. Formally, a quantum state vis represented by a unit two-dimensional complex vector. The method 100 of the invention stablishes a correspondence between the position vector of each of the data points on the Bloch sphere in the classical part of the algorithm with a corresponding quantum state of a qubit in the quantum part.

In the label selection step 103 of the second method 100, the number of labels in which the data points will be clustered in the classical digital computer 500 is selected, each label being the identifier for each cluster. According to an embodiment, I/O interface(s) of the classical digital computer 500 are used to import the number of labels.

In the label locating step 104 of the second method 100, the classical digital computer 500 locates uniformly the labels on the Bloch sphere, the position of each label on the Bloch sphere being identified by a corresponding initial label vector in the Bloch sphere pointing to the center of said label. Thus, each label corresponds to part of the surface of the Bloch sphere, all labels having the same area and shape. According to an embodiment, Plato's polygons can be used to locate the labels, in case the number of labels is 3, 4, 6, 12 or 20, for example.

In the cost function definition step 105 of the second method 100, a cost function is defined, the cost function having its minimum cost when the data points are clustered optimally, the cost function comprising a set of variational parameters, the set of variational parameters comprising at least one group of three variational parameters, and the set of variational parameters being common to all the data points. As in all methods aiming at finding the optimum configuration of a given system, a cost function has to be construed such that the cost function has a minimum at the point in which the configuration of the system is optimum. In the second method 100 of the invention, the minimum cost of the cost function will be reached when data points are assigned to the corresponding labels optimally. Once all data points and all labels are located on the Bloch sphere, the cost function, by minimization of its cost, will provide at least one group of three optimized parameters or angles that will define the rotations of the Bloch sphere or Euler rotations necessary to change the position of each data point from its initial location to the optimized location in which the cost function has its minimum cost, and all data points are assigned to the corresponding labels optimally. Thus, the at least one group of three optimized angles achieved by minimization of the cost function, valid for all the data points, carry the data points towards a configuration in which each data point is located as close as possible to its corresponding label. The variational parameters of the cost function are thus the three angles that are to be optimized by means of a classical optimizer for the cost function, executed in the classical digital computer 500, by which a set of optimized variational parameters, or optimized angles are obtained. The cost function comprises a set of variational parameters, the set of variational parameters comprising at least one group of three variational parameters. In case the set of variational parameters of the cost function comprises one group of three variational parameters, the optimization is executed for said group of three angles, such that in each optimization the optimized three angles necessary for the data points to change their position once by rotation of said optimized three angles are obtained. In case the set of variational parameters of the cost function comprises more than one group of three variational parameters, the optimization is executed for the set of variational parameters, such that in each optimization the groups of optimized three angles are obtained. Thus, for changing the position of the data points, sequential rotation of each group of optimized three angles will be executed on all the data points, this is sequential Euler rotations of each group of optimized three angles will be executed on all the data points.

In the initial cost calculation step 106 of the second method 100, the classical digital computer 500 calculates the cost of the cost function based on the initial position vector of each data point of the data set, and the initial label vector of each of the labels on the Bloch sphere. Once all data points and labels are located on the Bloch sphere, each data point will be located in the area corresponding to one label, so it can be identified in which label each data point is. In an embodiment of the second method 100, the cost function takes into account not only the distance between data points, but also the distance between each data point and the centroid position of the label in which the data point is.

In the classical optimizer execution step 107 of the second method 100, the classical digital computer 500 executes the classical optimizer for the cost function, obtaining a set of optimized variational parameters, and next, in the optimized variational sending step 108, the classical digital computer 500 sends the set of optimized variational parameters to the quantum computer 400.

For each optimization in the second method 100, all the data points on the Bloch sphere will move to a new position. However, this movement is not performed by the classical digital computer 500, but in a quantum computer 400. This way, the second method 100 of the invention benefits from the computing power of quantum computing, thus providing a hybrid solution to the clustering problem. For this purpose, the position vector of each data point on the Bloch sphere, when translated to a qubit, is considered analogous to a quantum state of the qubit. Analogously, the movement of the data points from an initial position to a new position in the Bloch sphere is performed as a change in the quantum state of the qubit. The quantum computer 400 comprises a qubit, and a quantum circuit with at least one layer on the qubit, each layer being configured to modify the quantum state of the qubit based on the values of the three optimized variational parameters in each group provided by the classical optimizer. The quantum computer 400 is configured to perform the steps 201 to 204 of the second method 100.

Figure 4:
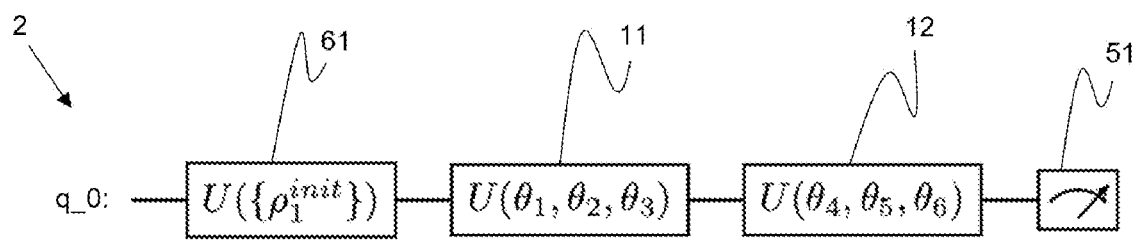
FIG. 4 is a schematic illustration of an embodiment of a quantum circuit of a quantum computer configured for performing the second method for performing unsupervised clustering of FIG. 3.

FIG. 4 is a schematic illustration of an embodiment of a quantum circuit 2 for a qubit in a quantum computer 400 configured for performing the quantum part of the second method 100. The quantum circuit 2 of FIG. 4 is configured for performing a plurality of operations on a qubit, namely q_0. The quantum circuit 2 comprises three layers on the qubit, each layer being implemented by means of a quantum gate. So, quantum circuit 2 comprises three quantum gates on the qubit. Quantum gates 11, 12, 13 are configured for performing unitary rotations on qubit q_0. Quantum circuit 2 additionally comprises measurement gate 51 configured for measuring the quantum state of qubit q_0.

In an embodiment of the second method 100 wherein quantum computer 400 comprises the embodiment of the quantum circuit 2 shown in FIG. 4, the cost function comprises a set of variational parameters comprising three groups of variational parameters, one group per layer or quantum gate of quantum circuit 2, each group comprising three variational parameters or three angles. Once the classical digital computer 500 executes the classical optimizer for the cost function, it obtains three groups of optimized variational parameters, and sends them to the quantum computer 400. Quantum gate 11 of quantum circuit 2 performs the unitary rotations on qubit_0 based on the values of the three optimized variational parameters of the first group, quantum gate 12 performs the unitary rotations on qubit_0 based on the values of the three optimized variational parameters of the second group, and quantum gate 13 performs the unitary rotations on qubit_0 based on the values of the three optimized variational parameters of the third group.

In the data point processing step 111, for each data point in the data set the classical digital computer 500 send the initial position vector of each data point of the data set to the quantum computer 400 in an initial position vector sending step 109.

In the second method 100 of the invention, the quantum computer 400, for each initial position vector received form the classical digital computer 500 translates said initial position vector into a corresponding initial quantum state of a qubit and initializes the qubit in the quantum circuit in said quantum state in the initial position vector translation step 201. Next, in the quantum circuit execution step 202 of the second method 100, the quantum computer 400 implements the quantum circuit, the quantum circuit comprising as many layers on the qubit as the number of groups of three variational parameters, each layer modifying the quantum state of the qubit based on the values of the three optimized variational parameters in each group, and the last layer modifying the quantum state of the qubit to a final quantum state.

In the quantum state sending step 203 of the second method 100, the quantum computer 400 measures and sends the final quantum state of the qubit in the quantum circuit to the classical digital computer 500. One of the main advantages of the method 100 of the invention is that it only uses a qubit for implementing the quantum part of the method 100, as the quantum computer 400, by means of the quantum circuit modifies the quantum state corresponding to each data point sequentially, always using the same qubit. This is also possible because the quantum circuit is the same for all data points, as the set of optimized variational parameters obtained in each execution of the classical optimizer is common for all data points.

In the quantum state translation step 110 of the second method, the classical digital computer 500 translates the final quantum state of the qubit received from the quantum computer 400 to a corresponding final position vector of the corresponding data point of the data set.

Once the classical digital computer 500 receives the final position vector for all the data points in the data set, in the cost calculation step 112 of the second method 100, the classical digital computer 500 calculates the cost of the cost function based on the final position vector of each data point of the data set, and the initial label vector of each of the labels. In case the minimum cost of the cost function is reached, the new position vectors of the data points correspond to the optimum positions of those data points in which they are optimally clustered.

In case the cost of the cost function is not minimum, the classical digital computer 500 executes the cost function minimization step 113 as many times as necessary until the minimum cost of the cost function is reached.

According to an embodiment of the second method 100 of the invention, the labels and their corresponding initial label vectors are kept stationary in the Bloch sphere once located.

According to an embodiment, in the second method 100 the cost function comprises an additional set of variational parameters, the additional set of variational parameters comprising at least one group of three variational parameters, and the additional set of variational parameters being common to all the labels. The cost function minimization step 113 of this embodiment comprises a label processing step 114 after the data point processing step 111 and before the cost function calculation step 112 comprising the following steps which are repeated for each label:

- an initial label vector sending step 121 wherein the classical digital computer 500 sends the initial label vector of each label to the quantum computer 400,
- an initial label vector translation step 221 wherein the quantum computer 400 translates said initial label vector into a corresponding initial quantum state of a qubit, and initializes the qubit in the quantum circuit in said quantum state,
- a quantum circuit execution step 222 wherein the quantum computer 400 implements the quantum circuit, each layer of the quantum circuit modifying the quantum state of the qubit based on the values of the three optimized variational parameters in each group of the additional set of variational parameters, and the last layer modifying the quantum state of the qubit to a final quantum state, and
- a quantum state sending step 223 wherein the quantum computer 400 sends the final quantum state of the qubit in the quantum circuit to the classical digital computer 500, and
- an additional quantum state translation step 122 wherein the classical digital computer 500 translates the final quantum state of the qubit to the corresponding final label vector of the corresponding label.

In the cost function calculation step 112 of this embodiment of the second method 100, the classical digital computer 500 calculates the cost of the cost function based on the final position vectors of the data points of the data set and the final label vectors of the labels.

According to an embodiment of the second method 100, the cost function is:

$$H = \frac{1}{2}\sum_{i,j=1}^{N} (\delta_{m_i m_j})(d(x_i, x_j)^\alpha + \lambda d(x_i, c_s))(1-f_i)(1-f_j)$$

with:
- $x_i$ being a data point of the data set, and $x_j$ being a different data point,
- N being the number of data points in the data set,
- $\delta_{m_i m_j}$ being equal to 1 where both data points $x_i$ and $x_j$ are located in the same label, and 0 where they are located in different labels, $m_i$ being the label in which data point $x_i$ is located, and $m_j$ being the label in which data point $x_j$ is located,
- m being the number of labels in which the data points will be clustered,
- $d(x_i, x_j)$ being the distance between data points $x_i$ and $x_j$,
- $d(x_i, f_s)$ being the distance between data point $x_i$ and $c_s$, $c_s$ being a centroid position of the label s in which data point $x_i$ is located, the centroid position being the average position of all the data points pertaining to the same label s,
- with $f_i$=max $(\langle\psi_s|\psi_i\rangle\langle\psi_i|\psi_s\rangle$/s∈[1, m], i∈[1, N]), where $|\psi_i\rangle$ is the final quantum state corresponding to data point $x_i$, or its equivalent, the new position vector of said data point, and $|\psi_s\rangle$ is the label vector for label s on the Bloch's sphere, thus $f_i$ being a fidelity quantifying how probable is that data point $x_i$ belongs to label s,
- α being a data dependent hyperparameter of the cost function accounting for the relative importance of the distance between data points, and
- λ being a data dependent hyperparameter of the cost function accounting for the relative importance of the distance between centroid position and data point.

The cost function used by the second method 100 for performing unsupervised clustering takes into account the distance between data points of the data set, the distance between each data point and the centroid position of the label in which said data point is located, and the fidelity or probability of said data point belonging to said label, the fidelity being calculated as the dot plot between the new position vector of said data point, and the initial label vector for said label is case label optimization is not implemented, or the final label vector for said label in case label optimization is implemented.

According to an embodiment of the second method 100, the hyperparameters of the cost function take the values α=2, and λ=½.

According to an embodiment, the second method 100 for performing unsupervised clustering comprises a rescaling step 1021 wherein the classical digital computer 500 rescales the plurality of data points of the data set before locating the plurality of data points on the surface of the unique Bloch sphere. The values of the attributes for the data points are rescaled independently such that the biggest value for each attribute is rescaled to 2π as much. Depending on the range of the values for each attribute, rescaling can be higher or lower, such that the two furthest points are still on the same lap of the sphere but with no overlapping. According to an embodiment of the method 100, a safety factor of 5% to 10% is used at rescaling so that data points having a value of 0 and $2\pi$ for an attribute, with the same value for the rest of attributes, are not coincident when located on the Bloch sphere. Thus, attribute values are rescaled from 0 to $1.9\pi$ when a safety factor of 5% is used, and from 0 to $1.8\pi$ when a safety factor of 10% is used.

According to an embodiment, the second method 100 for performing unsupervised clustering comprises a step 1071 wherein the classical digital computer 500 initializes the classical optimizer and initializes the variational parameters to random values before the classical digital computer 500 executes the classical optimizer for the first time. Depending on the classical optimizer used, it is necessary to initialize some parameters related to the optimizer before executing it. Thus, in this step, the parameters of the classical optimizer are selected.

According to an embodiment of the second method 100, the classical optimizer is a stochastic gradient descent optimizer.

According to an embodiment of the second method 100, the stochastic gradient descent optimizer is an Adam optimizer. In this embodiment, when initializing the classical optimizer, the learning rate, the batch size and the epochs are selected.

According to an embodiment of the second method 100, the stochastic gradient descent optimizer is a Momentum optimizer.

According to an embodiment of the second method 100, the quantum computer 400 is a classical digital computer 600 adapted to simulate a quantum computer 400. The quantum part of the method 100 for performing unsupervised clustering is not only suitable to be implemented in a quantum computer 400, but it can also be implemented in a classical digital computer 600 adapted to simulate the quantum circuit used in the quantum part of method 100.

A second aspect of the invention relates to a hybrid computing system for performing unsupervised clustering of a data set comprising a plurality of data points. The first hybrid computing system comprising a classical digital computer 500 and a quantum computer 400 in communication with the classical digital computer 500, the classical digital computer 500 being configured for executing the steps of the first method 100 of the invention which are implemented in the classical digital computer 500, and the quantum computer 400 being configured for executing the steps of the first method 100 of the invention which are implemented in the quantum computer 400.

The classical digital computer 500 of the first hybrid computing system comprises a memory element 504 comprising a computing program, the computing program defining a plurality of computer-executable instructions in a source language, and a processor 502 communicatively coupled to the memory element 504, the memory element 504 comprising the computer-executable instructions. The computer-executable instructions, when executed by the processor 502, cause the processor 502 to:

import the plurality of data points of the data set, locate the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit, calculate the cost of a cost function based on the initial position vector of each data point of the data set, the cost function having its minimum cost when the data points are clustered optimally, the cost function comprising a plurality of sets of variational parameters, each set of variational parameters comprising at least one group of three variational parameters, and the plurality of sets of variational parameters being common to all the data points, and execute a classical optimizer for the cost function, obtaining a plurality of sets of optimized variational parameters.

The quantum computer 400 of the hybrid computing system comprises a quantum processor comprising as many qubits as the number of sets of variational parameters in the cost function and a quantum circuit configured for performing a plurality of operations on said qubits.

The computer-executable instructions of the classical digital computer 500, when executed by the processor 502, also cause the processor 502 to, for each execution of the classical optimizer for the cost function send the plurality of sets of optimized variational parameters, and then, send the initial position vector of each data point of the data set one by one to the quantum computer (400).

The quantum computer 400 is configured to, for each initial position vector received by the quantum computer 400:

translate said initial position vector into a corresponding initial quantum state of a qubit, and initialize the plurality of qubits in the quantum circuit in said initial quantum state, implement the quantum circuit, the quantum circuit comprising as many layers on each qubit as the number of groups of three variational parameters in the corresponding set of variational parameters, each layer modifying the quantum state of the corresponding qubit based on the values of the three optimized variational parameters in each group, and the last layer on each qubit modifying the quantum state of said qubit to a final quantum state, the plurality of qubits in the quantum circuit being entangled, and measure and send the final quantum state of the qubits in the quantum circuit and the probability of said qubits being in that quantum state to the classical digital computer (500), the final quantum state of the qubits in the quantum circuit corresponding to a label in which the corresponding data point is.

The computer-executable instructions of the classical digital computer 500, when executed by the processor 502, also cause the processor 502 to calculate the cost of the cost function based on the final quantum state of the qubits in the quantum circuit of all the data points of the data set and the probability of said qubits being in said final quantum state, and to execute the classical optimizer until the cost function reaches its minimum cost.

According to an embodiment of the first hybrid computing system, the number of labels in which the data points are clustered is $2^n$ with n the number of qubits in the quantum circuit.

According to an embodiment of the first hybrid computing system, the computer-executable instructions, when executed by the processor 502, also cause the processor 502 to rescale the plurality of data points of the data set before locating the plurality of data points on the surface of the unique Bloch sphere.

According to an embodiment of the first hybrid computing system, the computer-executable instructions, when executed by the processor 502, also cause the processor 502 to initialize the classical optimizer and to initialize the variational parameters to random values before the classical digital computer 500 executes the classical optimizer for the first time.

According to an embodiment of the first hybrid computing system, the classical optimizer is a stochastic gradient descent optimizer, preferably an Adam optimizer or a Momentum optimizer.

According to an embodiment of the first hybrid computing system, the quantum computer 400 is a classical digital computer 600 adapted to simulate a quantum computer 400. The technical features of the classical digital computer 500 that are described below are also applicable to the classical digital computer simulating the quantum computer 400. Therefore, the detailed description of these technical features has been omitted for this embodiment so as not to be repetitive.

According to an embodiment of the first hybrid computing system the cost function used is the one used already described in the first method for performing unsupervised clustering of the invention.

The second hybrid computing system comprises a classical digital computer 500 and a quantum computer 400 in communication with the classical digital computer 500, the classical digital computer 500 being configured for executing the steps of the second method 100 of the invention which are implemented in the classical digital computer 500, and the quantum computer 400 being configured for executing the steps of the second method 100 of the invention which are implemented in the quantum computer 400.

The classical digital computer 500 of the second hybrid computing system comprises a memory element 504 comprising a computing program, the computing program defining a plurality of computer-executable instructions in a source language, and a processor 502 communicatively coupled to the memory element 504, the memory element 504 comprising the computer-executable instructions. The computer-executable instructions, when executed by the processor 502, cause the processor 502 to:
  import the plurality of data points of the data set,
  locate the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit,
  select a number of labels in which the data points will be clustered in the classical digital computer 500,
  locate uniformly the labels on the Bloch sphere, the position of each label on the Bloch sphere being identified by a corresponding initial label vector in the Bloch sphere pointing to the center of the label,
  calculate the cost of a cost function based on the initial position vector of each data point of the data set, and the initial label vector of each of the labels on the Bloch sphere, the cost function having its minimum cost when the data points are clustered optimally, the cost function comprising a set of variational parameters, the set of variational parameters comprising at least one group of three variational parameters, and the set of variational parameters being common to all the data points, and
  execute a classical optimizer for the cost function, obtaining a set of optimized variational parameters.

The quantum computer 400 of the second hybrid computing system comprises a quantum processor comprising a qubit and a quantum circuit configured for performing a plurality of operations on said qubit.

The computer-executable instructions of the classical digital computer 500, when executed by the processor 502, also cause the processor 502 to, for each execution of the classical optimizer for the cost function send the set of optimized variational parameters to the quantum computer 400, and then, send the initial position vector of each data point of the data set one by one to the quantum computer 400.

The quantum computer 400 is configured to, for each initial position vector received from the classical digital computer 500:
  translate said initial position vector into a corresponding initial quantum state of a qubit, and initialize the qubit in the quantum circuit in said initial quantum state,
  implement the quantum circuit, the quantum circuit comprising as many layers on the qubit as the number of groups of three variational parameters, each layer modifying the quantum state of the qubit based on the values of the three optimized variational parameters in each group, and the last layer modifying the quantum state of the qubit to a final quantum state, and
  measure and send the final quantum state of the qubit in the quantum circuit to the classical digital computer 500.

The computer-executable instructions of the classical digital computer 500, when executed by the processor 502, also cause the processor 502 to translate the final quantum state of the qubit to a corresponding final position vector of the corresponding data point of the data set, and to calculate the cost of the cost function based on the final position vectors of the data points of the data set and the initial label vectors of the labels, and to execute the classical optimizer until the cost function reaches its minimum cost.

According to an embodiment of the second hybrid computing system, the labels and their corresponding initial label vectors are kept stationary in the Bloch sphere once located.

According to an embodiment of the second hybrid computing system, the cost function comprises an additional set of variational parameters, the additional set of variational parameters comprising at least one group of three variational parameters, and the additional set of variational parameters being common to all the labels. The computer-executable instructions, when executed by the processor 502, also cause the processor 502 to, before calculating the cost of the cost function, send the initial label vector of each label one by one to the quantum computer 400, the quantum computer 400 being configured to, for each initial label vector received from the classical digital computer 500:
  translate said initial label vector into a corresponding initial quantum state of a qubit, and initialize the qubit in the quantum circuit in said quantum state,
  implement the quantum circuit, each layer of the quantum circuit modifying the quantum state of the qubit based on the values of the three optimized variational parameters in each group of the additional set of variational parameters, and the last layer modifying the quantum state of the qubit to a final quantum state, and
  measure and send the final quantum state of the qubit in the quantum circuit to the classical digital computer 500.

The computer-executable instructions, when executed by the processor 502, are also causing the processor 502 to, for each final quantum state received from the quantum computer 400, translate said final quantum state to a corresponding final label vector of the corresponding label, such that once the final position vectors for all the data points of the data set are received, and all the final label vectors for all labels are received, the cost of the cost function is calculated by the classical digital computer 500 based on the final position vectors of the data points of the data set and the final label vectors of the labels.

According to an embodiment of the second hybrid computing system, the computer-executable instructions, when executed by the processor 502, also cause the processor 502 to rescale the plurality of data points of the data set before locating the plurality of data points on the surface of the unique Bloch sphere.

According to an embodiment of the second hybrid computing system, the computer-executable instructions, when executed by the processor 502, also cause the processor 502 to initialize the classical optimizer and to initialize the variational parameters to random values before the classical digital computer 500 executes the classical optimizer for the first time.

According to an embodiment of the second hybrid computing system, the classical optimizer is a stochastic gradient descent optimizer, preferably an Adam optimizer or a Momentum optimizer.

According to an embodiment of the second hybrid computing system, the quantum computer 400 is a classical digital computer 600 adapted to simulate a quantum computer 400. The technical features of the classical digital computer 500 that are described below are also applicable to the classical digital computer simulating the quantum computer 400. Therefore, the detailed description of these technical features has been omitted for this embodiment so as not to be repetitive.

According to an embodiment of the second hybrid computing system the cost function used is the one already described in the second method for performing unsupervised clustering of the invention.

Figure 5:
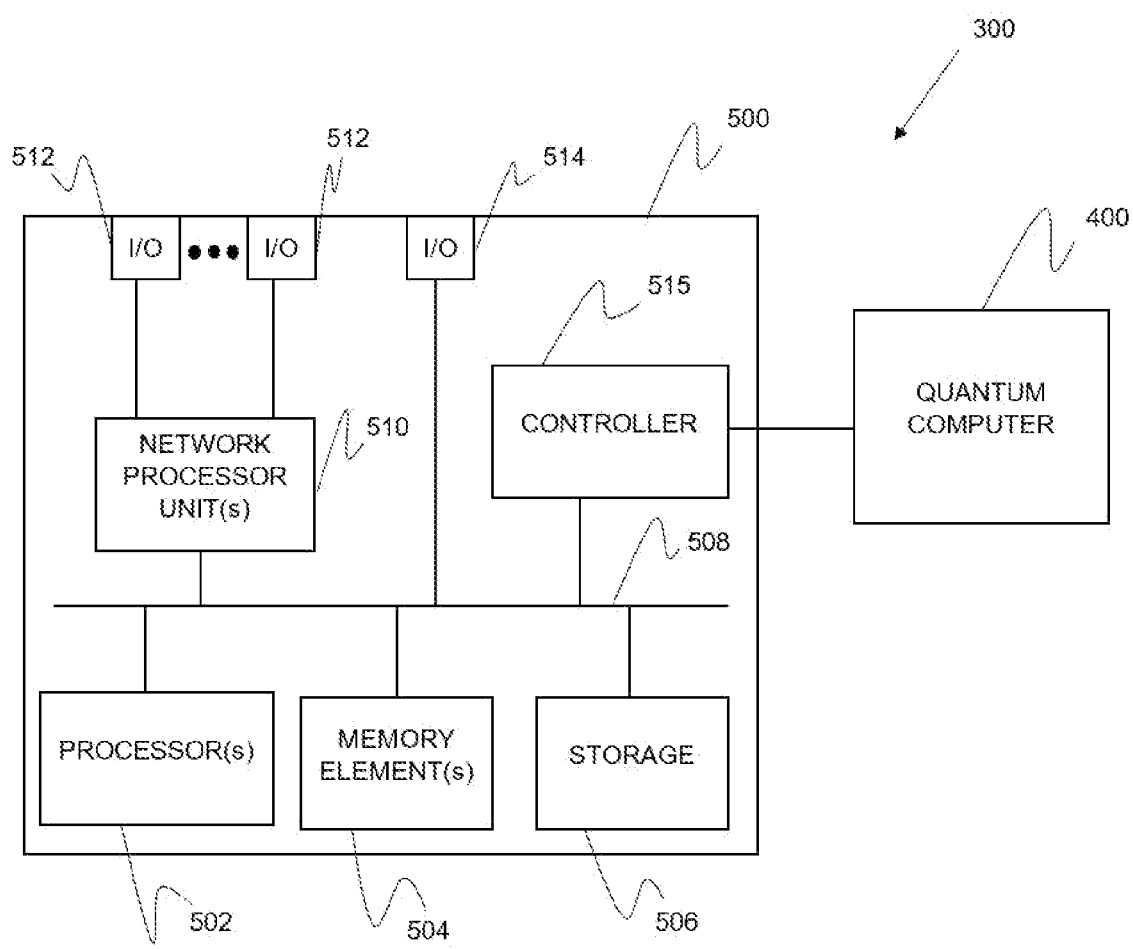
FIG. 5 is a schematic illustration of a hybrid computing system for performing unsupervised clustering of a data set comprising a plurality of data points according to the first or the second methods.

In FIG. 5, a schematic illustration of an embodiment of a hybrid computing system 300 for performing unsupervised clustering of a data set comprising a plurality of data points according to the first hybrid computing system or to the second hybrid computing system is shown. In at least one embodiment, the classical digital computer 500 may include in addition to the aforementioned processor 502 and memory element 504, storage 506, a bus 508, one or more network processor unit(s) 510 interconnected with one or more network input/output (I/O) interface(s) 512, one or more I/O interface(s) 514, a controller 515, and control logic 520.

Quantum computer 400 schematically represented in FIG. 5 comprises a quantum processor, the quantum processor being the aforementioned quantum processor in the first hybrid computing system according to the invention, or the aforementioned quantum processor in the second hybrid computing system according to the invention. The quantum computer 400 further comprises input components, these input components being electric, magnetic or optical components, among others, configured for inputting control signals into the quantum computer 400 for controlling the quantum gates and the qubits, and measurement components configured for reading the state of the qubits in the quantum processor. Nowadays there are different technologies suitable for implementing the quantum computer and the quantum circuit used by the quantum computer. Some but not all of these technologies are based on superconducting platforms, trapped ion platforms, photonic platforms, etc.

In various embodiments, control logic 520 may comprise instructions that, when executed, cause processor(s) 502 to perform operations which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In various embodiments, control logic 520 may comprise instructions that, when executed, cause processor(s) 502 to perform operations, such us simulating a quantum computer.

In at least one embodiment, processor(s) 502 is/are at least one hardware processor configured to execute various tasks, operations and/or functions for classical digital computer 500 according to software and/or instructions configured for classical digital computer 500. Processor(s) 502 (e.g., a hardware processor) can execute any type of instructions associated with data to achieve the operations detailed herein. Any of potential microprocessors, digital signal processor, baseband signal processor, modem, PHY, controllers, systems, managers, logic, and/or machines can be construed as being encompassed within the broad term 'processor'.

In at least one embodiment, memory element(s) 504 and/or storage 506 is/are configured to store data, information, software, and/or instructions associated with classical digital computer 500, and/or logic configured for memory element(s) 504 and/or storage 506. For example, any logic described herein (e.g., control logic 520) can, in various embodiments, be stored for classical digital computer 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of classical digital computer 500 to communicate in order to exchange information and/or data. Bus 508 can be implemented with any architecture designed for passing control, data and/or information between processors, memory elements/storage, peripheral devices, and/or any other hardware and/or software components that may be configured for classical digital computer 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between classical digital computer 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between classical digital computer 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to classical digital computer 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., computing program), logic, parameters, combinations thereof, and/or the like used for operations described herein. This includes memory element(s) 504 and/or storage 506 being able to store data, software, code, instructions (e.g., computing program), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

A third aspect of the invention relates to a computer-readable medium. The first computer-readable medium of the invention comprises computer-executable instructions for a method 100 for performing unsupervised clustering of a data set comprising a plurality of data points, such that when the computer-executable instructions are executed by a processor 502 in a classical digital computer 500, they cause the processor 502 to:

import the plurality of data points of the data set, locate the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit, calculate the cost of a cost function based on the initial position vector of each data point of the data set, the cost function having its minimum cost when the data points are clustered optimally, the cost function comprising a plurality of sets of variational parameters, each set of variational parameters comprising at least one group of three variational parameters, and the plurality of sets of variational parameters being common to all the data points, execute a classical optimizer for the cost function, obtaining a plurality of sets of optimized variational parameters, and for each execution of the classical optimizer for the cost function, send the plurality of sets of optimized variational parameters, and then, send the initial position vector of each data point of the data set one by one to a quantum computer 400.

The quantum computer 400 is in communication with the classical digital computer 500 and comprises a quantum processor comprising as many qubits as the number of sets of variational parameters in the cost function and a quantum circuit configured for performing a plurality of operations on said qubits. The quantum computer 400 is configured to, for each initial position vector received from the classical digital computer 500:

translate said initial position vector into a corresponding initial quantum state of a qubit, and initialize the plurality of qubits in the quantum circuit in said initial quantum state, implement the quantum circuit, the quantum circuit comprising as many layers on each qubit as the number of groups of three variational parameters in the corresponding set of variational parameters, each layer modifying the quantum state of the corresponding qubit based on the values of the three optimized variational parameters in each group, and the last layer on each qubit modifying the quantum state of said qubit to a final quantum state, the plurality of qubits in the quantum circuit being entangled, and measure and send the final quantum state of the qubits in the quantum circuit and the probability of said qubits being in said final quantum state to the classical digital computer 500, the final quantum state of the qubits in the quantum circuit corresponding to a label in which the corresponding data point is located.

The computer-executable instructions, when executed by the processor 502, also cause the processor 502 to calculate the cost of the cost function based on the final quantum state of the qubits in the quantum circuit of all the data points of the data set and the probability of said qubits being in said final quantum state, and to execute the classical optimizer until the cost function reaches its minimum cost.

According to an embodiment of the first computer-readable medium, the number of labels in which the data points are clustered is $2^n$ with n the number of qubits in the quantum circuit.

According to an embodiment of the first computer-readable medium, the computer-executable instructions, when executed by the processor 502, also cause the processor 502 to rescale the plurality of data points of the data set before locating the plurality of data points on the surface of the unique Bloch sphere.

According to an embodiment of the first computer-readable medium, the computer-executable instructions, when executed by the processor 502, also cause the processor 502 to initialize the classical optimizer and to initialize the variational parameters to random values before the classical digital computer 500 executes the classical optimizer for the first time.

According to an embodiment of the first computer-readable medium, the classical optimizer is a stochastic gradient descent optimizer, preferably an Adam optimizer or a Momentum optimizer.

According to an embodiment of the first computer-readable medium, the quantum computer 400 is a classical digital computer adapted to simulate a quantum computer 400. The technical features of the classical digital computer 500 that are described earlier are also applicable to the classical digital computer simulating the quantum computer 400. Therefore, the detailed description of these technical features has been omitted for this embodiment so as not to be repetitive.

According to an embodiment of the first computer-readable medium the cost function used is the one already described in the first method for performing unsupervised clustering of the invention.

The second computer-readable medium of the invention comprises computer-executable instructions for a method 100 for performing unsupervised clustering of a data set comprising a plurality of data points, such that when the computer-executable instructions are executed by a processor 502 in a classical digital computer 500, they cause the processor 502 to:
  import the plurality of data points of the data set,
  locate the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit,
  select a number of labels in which the data points will be clustered in the classical digital computer 500,
  locate uniformly the labels on the Bloch sphere, the position of each label on the Bloch sphere being identified by a corresponding initial label vector in the Bloch sphere pointing to the center of the label,
  calculate the cost of a cost function based on the initial position vector of each data point of the data set, and the initial label vector of each of the labels on the Bloch sphere, the cost function having its minimum cost when the data points are clustered optimally, the cost function comprising a set of variational parameters, the set of variational parameters comprising at least one group of three variational parameters, and the set of variational parameters being common to all the data points,
  execute a classical optimizer for the cost function, obtaining a set of optimized variational parameters, and
  for each execution of the classical optimizer for the cost function, send the set of optimized variational parameters, and then, send the initial position vector of each data point of the data set one by one to a quantum computer 400.

The quantum computer 400 is in communication with the classical digital computer 500, and comprises a quantum processor comprising a qubit and a quantum circuit configured for performing a plurality of operations on said qubit. The quantum computer 400 is configured to, for each initial position vector received from the classical digital computer 500:
  translate said initial position vector into a corresponding initial quantum state of a qubit, and initialize the qubit in the quantum circuit in said initial quantum state,
  implement the quantum circuit, the quantum circuit comprising as many layers on the qubit as the number of groups of three variational parameters, each layer modifying the quantum state of the qubit based on the values of the three optimized variational parameters in each group, and the last layer modifying the quantum state of the qubit to a final quantum state, and
  measure and send the final quantum state of the qubit in the quantum circuit to the classical digital computer 500.

The computer-executable instructions, when executed by the processor 502, also cause the processor 502 to translate the final quantum state of the qubit to a corresponding final position vector of the corresponding data point of the data set, and to calculate the cost of the cost function based on the final position vectors of the data points of the data set and the initial label vectors of the labels, and to execute the classical optimizer until the cost function reaches its minimum cost.

According to an embodiment of the second computer-readable medium, the labels and their corresponding label vectors are kept stationary in the Bloch sphere once located.

According to an embodiment of the second computer-readable medium, the cost function comprises an additional set of variational parameters, the additional set of variational parameters comprising at least one group of three variational parameters, and the additional set of variational parameters being common to all the labels. The computer-executable instructions, when executed by the processor 502, also cause the processor 502 to, before calculating the cost of the cost function, send the initial label vector of each label one by one to the quantum computer 400. The quantum computer 400 is configured to, for each initial label vector received from the classical digital computer 500:
  translate said initial label vector into a corresponding initial quantum state of a qubit, and initialize the qubit in the quantum circuit in said quantum state,
  implement the quantum circuit, each layer of the quantum circuit modifying the quantum state of the qubit based on the values of the three optimized variational parameters in each group of the additional set of variational parameters, and the last layer modifying the quantum state of the qubit to a final quantum state, and
  measure and send the final quantum state of the qubit in the quantum circuit to the classical digital computer 500.

The computer-executable instructions, when executed by the processor 502, also cause the processor 502 to translate the final quantum state of the qubit to a corresponding final label vector of the corresponding label, and to calculate the cost of the cost function based on the final position vectors of the data points of the data set and the final label vectors of the labels.

According to an embodiment of the second computer-readable medium, the computer-executable instructions, when executed by the processor 502, also cause the processor 502 to rescale the plurality of data points of the data set before locating the plurality of data points on the surface of the unique Bloch sphere.

According to an embodiment of the second computer-readable medium, the computer-executable instructions, when executed by the processor 502, also cause the processor 502 to initialize the classical optimizer and to initialize the variational parameters to random values before the classical digital computer 500 executes the classical optimizer for the first time.

According to an embodiment of the second computer-readable medium, the classical optimizer is a stochastic gradient descent optimizer, preferably an Adam optimizer or a Momentum optimizer.

According to an embodiment of the second computer-readable medium, the quantum computer 400 is a classical digital computer adapted to simulate a quantum computer 400. The technical features of the classical digital computer 500 that are described earlier are also applicable to the classical digital computer simulating the quantum computer 400. Therefore, the detailed description of these technical features has been omitted for this embodiment so as not to be repetitive.

According to an embodiment of the second computer-readable medium the cost function used is the one already described in the second method for performing unsupervised clustering of the invention.

What is claimed is:

1. A method for performing unsupervised clustering of a data set comprising a plurality of data points, comprising the following steps:
   a data set importing step wherein a classical digital computer imports the plurality of data points of the data set;
   a data point locating step wherein the classical digital computer locates the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit;
   a cost function definition step wherein a cost function is defined, the cost function having its minimum cost when the data points are clustered optimally, the cost function comprising a plurality of sets of variational parameters, each set of variational parameters comprising at least one group of three variational parameters, and the plurality of sets of variational parameters being common to all the data points;
   an initial cost function calculation step wherein the classical digital computer calculates the cost of the cost function based on the initial position vector of each data point of the data set;
   a cost function minimization step comprising the following steps which are repeated until the cost function reaches its minimum cost:
      a classical optimizer execution step wherein the classical digital computer executes a classical optimizer for the cost function, obtaining a plurality of sets of optimized variational parameters;
      an optimized variational parameter sending step wherein the classical digital computer sends the plurality of sets of optimized variational parameters to a quantum computer, the quantum computer clustering the plurality of data points using as many qubits as the number of sets of variational parameters in the cost function and comprising a quantum circuit configured for performing a plurality of operations on said qubits; and
      a data point processing step comprising the following steps which are repeated for each data point in the data set:
         an initial position vector sending step wherein the classical digital computer sends the initial position vector of each data point of the data set to the quantum computer;
         an initial position vector translation step wherein the quantum computer translates said initial position vector into a corresponding initial quantum state of a qubit, and initializes the plurality of qubits in the quantum circuit in said initial quantum state;
         a quantum circuit execution step wherein the quantum computer implements the quantum circuit, the quantum circuit comprising as many layers on each qubit as the number of groups of three variational parameters in the corresponding set of variational parameters, each layer modifying the quantum state of the corresponding qubit based on the values of the three optimized variational parameters in each group, and the last layer on each qubit modifying the quantum state of said qubit to a final quantum state, the plurality of qubits in the quantum circuit being entangled, and
         a quantum state sending step wherein the quantum computer measures and sends the final quantum state of the qubits in the quantum circuit and the probability of said qubits being in said final quantum state to the classical digital computer, the final quantum state of the qubits in the quantum circuit corresponding to a label in which the corresponding data point is located;
      a cost function calculation step wherein the classical digital computer calculates the cost of the cost function based on the final quantum state of the qubits in the quantum circuit of all the data points of the data set and the probability of said qubits being in said final quantum state.

2. The method for performing unsupervised clustering according to claim 1, wherein the number of labels in which the data points are clustered is $2^n$ with n the number of qubits in the quantum circuit.

3. The method for performing unsupervised clustering according to claim 1, comprising a rescaling step wherein the classical digital computer rescales the plurality of data points of the data set before locating the plurality of data points on the surface of the unique Bloch sphere.

4. The method for performing unsupervised clustering according to claim 1, comprising an initialization step wherein the classical digital computer initializes the classical optimizer and initializes the variational parameters to random values before the classical digital computer executes the classical optimizer for the first time.

5. The method for performing unsupervised clustering according to claim 1, wherein the classical optimizer is a stochastic gradient descent optimizer, preferably an Adam optimizer or a Momentum optimizer.

6. The method for performing unsupervised clustering according to claim 1, wherein the quantum computer is a classical digital computer adapted to simulate a quantum computer.

7. The method for performing unsupervised clustering according to claim 1, wherein the cost function is:

$$H = \frac{1}{2}\sum_{i,j=1}^{N} (\delta_{m_i m_j})(d(x_i, x_j)^{\alpha} + \lambda d(x_i, c_s))(1 - f_i)(1 - f_j)$$

with:
- $x_i$ being a data point of the data set, and $x_j$ being a different data point,
- N being the number of data points in the data set,
- $\delta_{m_i m_j}$ being equal to 1 where both data points $x_i$ and $x_j$ are located in the same label, and 0 where they are located in different labels, $m_i$ being the label in which data point $x_i$ is located, and $m_j$ being the label in which data point $x_j$ is located,
- m being the number of labels in which the data points will be clustered,
- $d(x_i, x_j)$ being the distance between data points $x_i$ and $x_j$,
- $d(x_i, c_s)$ being the distance between data point $x_i$ and $c_s$, $c_s$ being a centroid position of the label s in which data point $x_i$ is located, the centroid position being the average position of all the data points pertaining to the same label s,
- $f_i$ being the probability of data point $x_i$ belonging to label s,
- $\alpha$ being a data dependent hyperparameter of the cost function accounting for the relative importance of the distance between data points, and
- $\lambda$ being a data dependent hyperparameter of the cost function accounting for the relative importance of the distance between centroid position and data point.

8. A method for performing unsupervised clustering of a data set comprising a plurality of data points, comprising the following steps:
- a data set importing step wherein a classical digital computer imports the plurality of data points of the data set;
- a data point locating step wherein the classical digital computer locates the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit;
- a label selection step wherein a number of labels in which the data points will be clustered is selected;
- a label locating step wherein the classical digital computer locates uniformly the labels on the Bloch sphere, the position of each label on the Bloch sphere being identified by a corresponding initial label vector in the Bloch sphere pointing to the center of said label;
- a cost function definition step wherein a cost function is defined, the cost function having its minimum cost when the data points are clustered optimally, the cost function comprising a set of variational parameters, the set of variational parameters comprising at least one group of three variational parameters, and the set of variational parameters being common to all the data points;
- an initial cost function calculation step wherein the classical digital computer calculates the cost of the cost function based on the initial position vector of each data point of the data set, and the initial label vector of each of the labels on the Bloch sphere;
- a cost function minimization step comprising the following steps which are repeated until the cost function reaches its minimum cost:
  - a classical optimizer execution step wherein the classical digital computer executes a classical optimizer for the cost function, obtaining a set of optimized variational parameters;
  - an optimized variational parameter sending step wherein the classical digital computer sends the set of optimized variational parameters to a quantum computer, the quantum computer clustering the plurality of data points using a single qubit and comprising a quantum circuit configured for performing a plurality of operations on said single qubit;
  - a data point processing step comprising the following steps which are repeated for each data point in the data set:
    - an initial position vector sending step wherein the classical digital computer sends the initial position vector of each data point of the data set to the quantum computer;
    - an initial position vector translation step wherein the quantum computer translates said initial position vector into a corresponding initial quantum state of a qubit, and initializes the qubit in the quantum circuit in said quantum state;
    - a quantum circuit execution step wherein the quantum computer implements the quantum circuit, the quantum circuit comprising as many layers on the qubit as the number of groups of three variational parameters, each layer modifying the quantum state of the qubit based on the values of the three optimized variational parameters in each group, and the last layer modifying the quantum state of the qubit to a final quantum state;
    - a quantum state sending step wherein the quantum computer measures and sends the final quantum state of the qubit in the quantum circuit to the classical digital computer; and
    - a quantum state translation step wherein the classical digital computer translates the final quantum state of the qubit to a corresponding final position vector of the corresponding data point of the data set;
  - a cost function calculation step wherein the classical digital computer calculates the cost of the cost function based on the final position vectors of the data points of the data set and the initial label vectors of the labels.

9. The method for performing unsupervised clustering according to claim 8, wherein the labels and their corresponding initial label vectors are kept stationary in the Bloch sphere once located.

10. The method for performing unsupervised clustering according to claim 8, wherein the cost function comprises an additional set of variational parameters, the additional set of variational parameters comprising at least one group of three variational parameters, and the additional set of variational parameters being common to all the labels, the cost function minimization step comprising a label processing step after the data point processing step and before the cost function calculation step comprising the following steps which are repeated for each label:
- an initial label vector sending step wherein the classical digital computer sends the initial label vector of each label to the quantum computer;
- an initial label vector translation step wherein the quantum computer translates said initial label vector into a corresponding initial quantum state of a qubit, and initializes the qubit in the quantum circuit in said quantum state;
- a quantum circuit execution step wherein the quantum computer implements the quantum circuit, each layer of the quantum circuit modifying the quantum state of the qubit based on the values of the three optimized variational parameters in each group of the additional set of variational parameters, and the last layer modifying the quantum state of the qubit to a final quantum state;
- a quantum state sending step wherein the quantum computer sends the final quantum state of the qubit in the quantum circuit to the classical digital computer; and
- an additional quantum state translation step wherein the classical digital computer translates the final quantum state of the qubit to a corresponding final label vector of the corresponding label;

wherein in the cost function calculation step the classical digital computer calculates the cost of the cost function based on the final position vectors of the data points of the data set and the final label vectors of the labels.

11. The method for performing unsupervised clustering according to claim 8, wherein the cost function is:

$$H = \frac{1}{2} \sum_{i,j=1}^{N} (\delta_{m_i m_j})(d(x_i, x_j)^\alpha + \lambda d(x_i, c_s))(1 - f_i)(1 - f_j)$$

with:
- $x_i$ being a data point of the data set, and $x_j$ being a different data point,
- N being the number of data points in the data set,
- $\delta_{m_i m_j}$ being equal to 1 where both data points $x_i$ and $x_j$ are located in the same label, and 0 where they are located in different labels, $m_i$ being the label in which data point $x_i$ is located, and $m_j$ being the label in which data point $x_j$ is located,
- m being the number of labels in which the data points will be clustered,
- $d(x_i, x_j)$ being the distance between data points $x_i$ and $x_j$,
- $d(x_i, f_s)$ being the distance between data point $x_i$ and $c_s$,
- $c_s$ being a centroid position of the label s in which data point $x_i$ is located, the centroid position being the average position of all the data points pertaining to the same label s,
- with $f_i$=max $((\psi_s|\psi_i)(\psi_i|\psi_s)/s\in[1, m], i\in[1, N])$, where $/\psi_i$) is the final quantum state corresponding to data point $x_i$ or its equivalent, the new position vector of said data point, and $/\psi_s$) is the label vector for label s on the Bloch's sphere, thus $f_i$ being a fidelity quantifying how probable is that data point $x_i$ belongs to label s,
- α being a data dependent hyperparameter of the cost function accounting for the relative importance of the distance between data points, and
- λ being a data dependent hyperparameter of the cost function accounting for the relative importance of the distance between centroid position and data point.

12. The method for performing unsupervised clustering according to claim 11, where the hyperparameters of the cost function take the values α=2, and λ=1/2.

13. The method for performing unsupervised clustering according to claim 8, comprising a rescaling step wherein the classical digital computer rescales the plurality of data points of the data set before locating the plurality of data points on the surface of the unique Bloch sphere.

14. The method for performing unsupervised clustering according to claim 8, the method comprising an initialization step wherein the classical digital computer initializes the classical optimizer and initializes the variational parameters to random values before the classical digital computer executes the classical optimizer for the first time.

15. The method for performing unsupervised clustering according to claim 8, wherein the classical optimizer is a stochastic gradient descent optimizer, preferably an Adam optimizer or a Momentum optimizer.

16. The method for performing unsupervised clustering according to claim 8, wherein the quantum computer is a classical digital computer adapted to simulate a quantum computer.

17. A non-transitory computer-readable medium comprising computer-executable instructions for a method for performing unsupervised clustering of a data set comprising a plurality of data points, wherein when executed by a processor in a classical digital computer cause the processor to:
- import the plurality of data points of the data set;
- locate the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit;
- calculate the cost of a cost function based on the initial position vector of each data point of the data set, the cost function having its minimum cost when the data points are clustered optimally, the cost function comprising a plurality of sets of variational parameters, each set of variational parameters comprising at least one group of three variational parameters, and the plurality of sets of variational parameters being common to all the data points;
- execute a classical optimizer for the cost function, obtaining a plurality of sets of optimized variational parameters; and
- for each execution of the classical optimizer for the cost function, send the plurality of sets of optimized variational parameters, and then, send the initial position vector of each data point of the data set one by one to a quantum computer;
- the quantum computer being in communication with the classical digital computer, the quantum computer comprising a quantum processor clustering the plurality of data points using as many qubits as the number of sets of variational parameters in the cost function and comprising a quantum circuit configured for performing a plurality of operations on said qubits, the quantum computer being configured to, for each initial position vector received from the classical digital computer:

translate said initial position vector into a corresponding initial quantum state of a qubit, and initialize the plurality of qubits in the quantum circuit in said initial quantum state;

implement the quantum circuit, the quantum circuit comprising as many layers on each qubit as the number of groups of three variational parameters in the corresponding set of variational parameters, each layer modifying the quantum state of the corresponding qubit based on the values of the three optimized variational parameters in each group, and the last layer on each qubit modifying the quantum state of said qubit to a final quantum state, the plurality of qubits in the quantum circuit being entangled; and measure and send the final quantum state of the qubits in the quantum circuit and the probability of said qubits being in said final quantum state to the classical digital computer, the final quantum state of the qubits in the quantum circuit corresponding to a label in which the corresponding data point is located;

the computer-executable instructions, when executed by the processor, also causing the processor to calculate the cost of the cost function based on the final quantum state of the qubits in the quantum circuit of all the data points of the data set and the probability of said qubits being in said final quantum state, and to execute the classical optimizer until the cost function reaches its minimum cost.

18. The non-transitory computer-readable medium according to claim 17, wherein the quantum computer is a classical digital computer adapted to simulate a quantum computer.

19. A non-transitory computer-readable medium comprising computer-executable instructions for a method for performing unsupervised clustering of a data set comprising a plurality of data points, wherein when executed by a processor in a classical digital computer cause the processor to:

import the plurality of data points of the data set;

locate the plurality of data points on the surface of a unique Bloch sphere, the position of each data point on the Bloch sphere being identified by a corresponding initial position vector in the Bloch sphere, the Bloch sphere representing a qubit, and the initial position vector of each data point on the Bloch sphere representing a quantum state of the qubit;

select a number of labels in which the data points will be clustered;

locate uniformly the labels on the Bloch sphere, the position of each label on the Bloch sphere being identified by a corresponding initial label vector in the Bloch sphere pointing to the center of the label;

calculate the cost of a cost function based on the initial position vector of each data point of the data set, and the initial label vector of each of the labels on the Bloch sphere, the cost function having its minimum cost when the data points are clustered optimally, the cost function comprising a set of variational parameters, the set of variational parameters comprising at least one group of three variational parameters, and the set of variational parameters being common to all the data points;

execute a classical optimizer for the cost function, obtaining a set of optimized variational parameters; and for each execution of the classical optimizer for the cost function, send the set of optimized variational parameters, and then, send the initial position vector of each data point of the data set one by one to a quantum computer, the quantum computer being in communication with the classical digital computer, the quantum computer comprising a quantum processor clustering the plurality of data points using a single qubit and comprising a quantum circuit configured for performing a plurality of operations on said single qubit, the quantum computer being configured to, for each initial position vector received from the classical digital computer:

translate said initial position vector into a corresponding initial quantum state of a qubit, and initialize the qubit in the quantum circuit in said initial quantum state;

implement the quantum circuit, the quantum circuit comprising as many layers on the qubit as the number of groups of three variational parameters, each layer modifying the quantum state of the qubit based on the values of the three optimized variational parameters in each group, and the last layer modifying the quantum state of the qubit to a final quantum state; and measure and send the final quantum state of the qubit in the quantum circuit to the classical digital computer;

the computer-executable instructions, when executed by the processor, also causing the processor to translate the final quantum state of the qubit to a corresponding final position vector of the corresponding data point of the data set, and to calculate the cost of the cost function based on the final position vectors of the data points of the data set and the initial label vectors of the labels, and to execute the classical optimizer until the cost function reaches its minimum cost.

20. The non-transitory computer-readable medium according to claim 19, wherein the labels and their corresponding initial label vectors are kept stationary in the Bloch sphere once located.

21. The non-transitory computer-readable medium according to claim 19, wherein the cost function comprises an additional set of variational parameters, the additional set of variational parameters comprising at least one group of three variational parameters, and the additional set of variational parameters being common to all the labels, and wherein the computer-executable instructions, when executed by the processor, also cause the processor to, before calculating the cost of the cost function, send the initial label vector of each label one by one to the quantum computer, the quantum computer being configured to, for each initial label vector received from the classical digital computer:

translate said initial label vector into a corresponding initial quantum state of a qubit, and initialize the qubit in the quantum circuit in said quantum state;

implement the quantum circuit, each layer of the quantum circuit modifying the quantum state of the qubit based on the values of the three optimized variational parameters in each group of the additional set of variational parameters, and the last layer modifying the quantum state of the qubit to a final quantum state; and measure and send the final quantum state of the qubit in the quantum circuit to the classical digital computer;

the computer-executable instructions, when executed by the processor, also causing the processor to translate the final quantum state of the qubit to a corresponding final label vector of the corresponding label, and to calculate the cost of the cost function based on the final position vectors of the data points of the data set and the final label vectors of the labels.

\* \* \* \* \*